United States Patent [19]

Gay

[11] 4,123,399

[45] Oct. 31, 1978

[54] PLASTICIZED, HEAT-STABILIZED PVC COMPOSITIONS

[75] Inventor: Michel Gay, Lyons, France

[73] Assignee: Rhone-Poulenc Industries, Paris, France

[21] Appl. No.: 810,845

[22] Filed: Jun. 28, 1977

[30] Foreign Application Priority Data

Jun. 28, 1976 [FR] France ............................. 76 20181
Jan. 28, 1977 [FR] France ............................. 77 3086

[51] Int. Cl.² .............................................. C08K 5/09
[52] U.S. Cl. ........................ 260/23 XA; 260/30.6 R; 260/31.6; 260/31.8 R; 260/45.7 R; 260/45.8 A; 260/45.8 NT; 260/45.95 L
[58] Field of Search .......... 260/23 XA, 45.95, 45.7 R, 260/31.8 R, 30.6, 31.6, 45.8 A, 45.8 NT, 899

[56] References Cited

U.S. PATENT DOCUMENTS

| | | | |
|---|---|---|---|
| 3,001,970 | 9/1961 | Ebel et al. .......................... | 260/45.7 R |
| 3,310,525 | 3/1967 | Lappin et al. .................. | 260/45.95 F |
| 3,373,130 | 3/1968 | Hardy .............................. | 260/31.8 R |
| 3,493,536 | 2/1970 | Weisfeld .......................... | 260/45.7 R |

OTHER PUBLICATIONS

Kunstoffe 67(1977)3 pp. 9–11.

Primary Examiner—V. P. Hoke
Attorney, Agent, or Firm—Bacon & Thomas

[57] ABSTRACT

PVC is plasticized and stabilized against the effects of heat by formulating therewith [1] a plasticizer, and minor amounts of [2] a mixed organometallic salt couplet, [3] a polyol, and [4] a β-diketone.

18 Claims, No Drawings

PLASTICIZED, HEAT-STABILIZED PVC COMPOSITIONS

BACKGROUND OF THE INVENTION

1. Field of the Invention:

The present invention relates to plasticized and stabilized poly (vinyl chloride) ["PVC"] compositions, especially those PVC compositions destined for the production of transparent molded articles.

2. Description of the Prior Art

A great number of reference articles relate to PVC-based compositions, plasticized and stabilized against thermal degradation or decomposition caused by either the actual on-stream processing of the composition, or upon subsequent high-temperature utilization.

It is known, for example, according to U.S. Pat. No. 2,711,401, that the use of a mixture of polyol and organic salts of polyvalent metals enables retardation of the yellowing of molded articles subjected to heat.

Furthermore, according to U.S. Pats. Nos. 3,003,998, 3,003,999 and 3,004,000, non-toxic stabilizers have been found which can be used for the packaging of food products, and which are based on a mixture of fatty acid salts of magnesium, zinc or calcium with a polyol. However, the transparency demanded for certain applications canot be obtained with these mixtures.

French Pat. No. 1,435,882 proposes the association of an organic salt of an alkali metal and a ketoacetic ester or dehydroacetic acid. However, the resulting stabilization is far from satisfactory.

DESCRIPTION OF THE INVENTION

The present invention relates to compositions which are devoid of toxic constituents and which can be processed into transparent molded articles which are without coloration, and the initial color of which is not appreciably deleteriously affected by heat treatment of 180° C. for more than an hour.

These compositions according to the invention are characterized in that they contain, per 100 parts by weight of the PVC:

[a] 5 to 120 parts by weight of a conventional PVC plasticizer;
[b] 0.1 to 5 parts by weight of a pair of organic acid salts of calcium and of zinc;
[c] 0.03 to 1 part by weight of a linear polyol having at least four hydroxyl functions, at least one of which being a primary alcohol function; and
[d] 0.05 to 5 parts by weight of an organic compound having the structural formula:

$$R_1-CO-CHR_2-CO-R_3 \quad (I)$$

wherein $R_1$ and $R_3$, which can be identical or different, represent:
 a linear or branched chain alkyl or alkenyl radical having at least one and up to 36 carbon atoms,
 an aralkyl radical having from 7 to 36 carbon atoms, and
 an aryl or cycloaliphatic radical having fewer than 14 carbon atoms, the cycloaliphatic radicals optionally comprising carbon-to-carbon unsaturation or double bonds.

The foregoing radicals either may or may not be substituted, and, when substituted, suitable substituents comprise, for example, halogen atoms, or, in the case of the aryl or cycloaliphatic radicals, methyl or ethyl radicals; they too can be modified by the presence of one or more of the linkages —O—,

or —CO—, in the aliphatic chain; and together same can also represent a divalent alkylene radical of 2 to 5 carbon atoms, optionally containing a bridging oxygen or nitrogen atom.

$R_2$ represents:
 a hydrogen atom,
 an alkyl or alkenyl radical, having at least one and up to 36 carbon atoms, which can contain one or more of the linkages —O—,

or —CO—,
 a radical of the formula —CO—$R_4$, $R_4$ representing an alkyl radical having from 1 to 36 carbon atoms, or an aryl radical having from 6 to 10 carbon atoms, or
 a radical of the formula

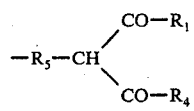

$R_5$ representing an alkyl radical having from 1 to 6 carbon atoms, and $R_1$ and $R_3$ being as above.

The radicals represented by the symbols $R_1$, $R_2$ and $R_3$ are, in addition, such that:
 for $R_1$ and $R_3$, the carbon atom bonded to the respective carbonyl function of the compound (I) is free from ethylenic or carbonyl unsaturation;
 for $R_1$ or $R_3$, the carbon atom bonded to the respective carbonyl function does not comprise a moiety which includes aromatic unsaturation.

One of the radicals $R_1$ or $R_3$ can represent a hydrogen atom.

$R_1$ and $R_2$ together can represent a divalent radical selected from among the following:
 a linear or branched alkylene or alkenylene radical, having up to 36 carbon atoms,
 an aralkylene radical having from 7 to 36 carbon atoms, and
 an arylene or cycloalkylene radical having fewer than 14 carbon atoms, the cycloaliphatic radicals optionally comprising carbon-to-carbon unsaturation or double bonds.

These latter radicals too either may or may not be substituted, and, when substituted, suitable substituents comprise, for example, halogen atoms, or, in the case of the aryl or cycloaliphatic radicals, methyl or ethyl radicals.

The radicals heretofore enumerated can also be modified by the presence, in any given aliphatic chain, of one or more of the linkages:

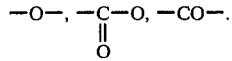

The stabilizing systems above identified can additionally comprise an epoxidized compound, such as, for example, epoxidized soya-bean oil, in a proportion of between 0 and about 8% by weight relative to the polymer. The addition of this type of compound further improves the heat stability.

By "PVC-based compositions", or the like, there is intended essentially those compositions in which the polymer is a homopolymer of vinyl chloride, and one preferably obtained via a bulk or suspension polymerization process.

However, polymers obtained by other processes, or containing minor fractions, for example, below 20% by weight, of other ethylenically unsaturated monomers copolymerized with the vinyl chloride, are also within the ambit of the invention. Comonomers of this type comprise, for example, vinylidene chloride, vinyl or maleic esters, or ethylene or other olefin comonomers.

By "conventional" PVC plasticizers there is intended all of those plasticizers which are normally and typically used to plasticize PVC. Plasticizers of this type are described in the *Encyclopedia of Polymer Science and Technology*, Vol. 14, pages 396 to 400, Interscience Publishers (1964). These are essentially phthalates, phosphates, esters of aliphatic diacids or, where appropriate, polyesters.

Four pairs of organic salts of metals are particularly valuable for stabilization according to the invention: calcium or barium salts used conjointly with cadmium or zinc salts, the barium-cadmium pair being considered the most efficient. However, it has also been found that results which are at least equivalent are obtained by substituting the calcium-zinc pair for the barium-cadmium pair in the compositions of the invention. Furthermore, the absence of toxicity of the calcium and zinc salts makes this latter pair of metals the more preferable.

The anions of these salts are preferably selected from among the aliphatic and aromatic organic acids or fatty acids, which either may or may not be saturated or substituted. Among the salts commonly employed there are mentioned as illustrative: acetates, diacetates, stearates, oleates, laurates palmitates, benzoates, hydroxystearates or ethyl-2-hexanoates.

A large number of polyols too have been proposed for increasing the stability of PVC, and particularly those polyols having more than two and fewer than nine hydroxyl group and having a boiling point above 120° C., such as glycol, glycerol, sorbitol and pentaerythritol [U.S. Pat. No. 2,711,401].

French Pat. No. 1,435,882 reflects, especially in the Table 6 thereof, that the combined use of an organic stabilizer, such as a ketoacetic ester, and a polyol, such as mannitol, sorbitol, pentaerythritol, dipentaerythritol or tripentaerythritol, provides but poor heat stabilization of PVC.

It has now been found that a very significant increase in heat stability is obtained by adding to the stabilizing system, consisting of a pair of metal salts and β-diketone compounds, from 0.03 to 1, and preferably from 0.1 to 0.25 parts per 100 parts by weight of PVC, one of the following three polyols: D-xylitol, D-sorbitol and D-mannitol. The selection of suitable amounts of the polyol is crucial and depends in turn on the amount of the β-diketone compound and calcium-zinc pair utilized.

Addition of these polyols does not effect coloration of any molded articles shaped from the subject compositions and considerably prolongs the heat stabilization by preventing yellowing. Furthermore, these polyols are not toxic.

All of the β-diketone compounds satisfying the above definition and parameters are suitable for purposes of this invention, whether used alone or in admixture. Representative of the especially preferred compounds are: benzoylacetone, lauroylbenzoylmethane, myristoylbenzoylmethane, palmitoylbenzoylmethane, stearoylbenzoylmethane, behenoylbenzoylmethane, dilauroylmethane, dimyristoylmethane, dipalmitoylmethane, distearoylmethane, dibehenoylmethane, lauroylmyristoylmethane, lauroylpalmitoylmethane, lauroylstearoylmethane, lauroylbehenoylmethane, myristoylpalmitoylmethane, myristoylstearoylmethane, myristoylbehenoylmethane, palmistoylstearoylmethane, palmitoylbehenoylmethane, stearoylbehenoylmethane, 1-phenyltriacetone-1,3-dione, acetyltetralone, palmitoyltetralone, stearoyltetralone, palmitoylcyclohexanone, stearoylcyclohexanone and (paramethoxybenzoyl)-stearoylmethane. These compounds are utilized in amounts of between about 0.05 and 5% by weight relative to the weight of the PVC and, preferably, between about 0.1 and 1% by weight.

Various adjuvants can be added to the subject compositions, such as, for example, antioxidants, or UV light stabilizers, and additives, such as lubricants, ot facilitate processing. It is advisable to carefully monitor the choice of these additives in order not to risk detracting from heat stability. Thus, it has been established that lubricants containing free hydroxyl groups did not display any detrimental effects with regard to heat stability: compounds such as glycerol monostearate or propylene glycol monostearate are especially preferred.

The preparation of the compositions according to the invention can be carried out by any known process. The different stabilizers can be mixed with the plasticizer, either individually, or after having been admixed and then incorporated into the polymer. All of the usual and typical methods known to this art are suitable for achieving the mixing of the various ingredients. However, the homogenization of the composition can be most advantageously carried out by means of a malaxator or a roll mixer, and it is possible to conduct the operation at a temperature such that the material is fluid, which facilitates the mixing.

The compositions themselves can be processed in accordance with conventional techniques normally employed for working plasticized PVC compositions, for example, by extrusion, injection, calendering, molding, rotational molding, slush molding or deposition on a support, which may or may not be provided with a release surface.

The association of calcium-zinc, a β-ketone compound and sorbitol, mannitol or xylitol exhibits very significant stabilizing activity, which enables one to reduce the quantities employed of these various products. The risks of initial coloration or phenomena detracting from transparency are thus limited. In addition, it is possible to process in the absence of additives commonly used in plasticized PVC formulations, such as, for example, phosphites or epoxidized mixtures of fatty acid esters [epoxidized soya-bean oil]. By judicious choice of the products utilized, it is thus possible to obtain very highly stabilized compositions, which compositions are acceptable for use with foodstuffs.

In order to further illustrate the present invention and the advantages thereof, the following specific examples are given, it being understood that same are intended only as illustrative and in nowise limitative.

EXAMPLES 1 to 6

The following were mixed in a ball mill:
2,000 g of PVC powder, having a viscosity index of 95 [standards specifications NFT 51, 013] obtained by bulk polymerization and sold under the trade name LUCOVYL GB 9,550;
780 g of dioctyl phthalate;
10 g of calcium stearate; and
5 g of zinc stearate.

The mixture was allowed to rotate on the rollers for 15 hours.

The following were charged into six 250 cm³ powder mills, containing a few porcelain balls:
70 g of the mixture above obtained (A);
0.25 g of stearoylbenzoylmethane;
and, respectively, 0.07, 0.10, 0.15 and 0.20 g of xylitol; 0.10 g of D-sorbitol or 0.1 g of D-mannitol.

The mixture was allowed to rotate on a roller mixer for 15 hours, the homogeneous compositions B, C, D, E, F and G being obtained in this manner.

From these compositions, as well as from the composition A, sheets of 2.5 mm thickness were prepared by means of a calendar heated to 160° C. [contact time at this temperature: 3 minutes].

Out of these sheets, rectangular test-pieces of the dimensions 10 × 20 mm were cut, and which were then placed in a ventilated oven heated to 180° C. for variable periods of time.

The coloration of the different samples were determined according to the Gardner scale with the aid of a Lovibond disc.

The following results were obtained:

TABLE

| Compositions | Coloration index after X minutes | | | | | | |
|---|---|---|---|---|---|---|---|
| | 0 | 7 | 15 | 25 | 35 | 45 | 55 | 65 |
| A | 0 | 3 | 8 | black | | | | |
| B | 0 | 0 | 0 | 1 | 1 | 2 | 6 | 10 |
| C | 0 | 0 | 0 | 1 | 1 | 2 | 2 | 3 |
| D | 0 | 0 | 1 | 2 | 3 | 4 | 4 | 5 |
| E | 0 | 0 | 1 | 2 | 3 | 4 | 4 | 4 |
| F | 0 | 0 | 0 | 1 | 1 | 1 | 1 | 2 |
| G | 0 | 0 | 0 | 0 | 1 | 1 | 2 | 2 |

It was found that the addition of 0.5% of stearoylbenzoylmethane and 0.2% of one of the noted three polyols permits the time of heat treatment at 180° C. [necessary to obtain samples which are only faintly yellow-colored] to be multiplied by about 10.

If the quantity of polyol be increased [compositions D and E], or if the quantity of polyol be too small [composition B], a coloration develops after 30 minutes of heat treatment.

EXAMPLE 7

A composition was prepared which is normally used for obtaining semi-rigid profiles destined for decorative purposes.

The following were placed in a high-speed mixer:
11.245 kg of PVC powder having a viscosity index of 80 [standard specification NFT 51,013];
0.104 kg of calcium stearate;
0.039 kg of zinc stearate;
0.026 kg of stearoylbenzoylmethane; and
0.026 kg of sorbitol.

The mixture was rotated for 5 minutes at 500 rpm. 0.949 kg of dioctyl phthalate was then introduced over a 3 minute period. The mixture was rotated for an additional 5 minutes at 500 rpm. The mixing speed was then increased to 1,000 rpm and the mixture was allowed to rotate at this speed for that time necessary for the temperature of the mixture to rise to 115°–120° C., and which was about 15 minutes. A dry powder was obtained which was fed into a single-screw extruder rotating at 50 rpm and having a screw diameter of 40 mm and length of 800 mm. The temperature was regulated so as to achieve the following temperatures: 150° C. at the inlet, 155° C. at the middle of the screw, 160° C. at the end of the screw and 165° C. at the head of the extruder, which was equipped with a die and a system for chopping the strands, issuing from the die, into granules.

Starting with these granules, a sheet of a few millimeters' thickness was made by rolling between cylinders heated to 180° C., and from which small pieces were cut, which were placed into a ventilated oven, heated to 185° C., for variable periods of time.

The time after which the small test piece had become black was recorded: 75 minutes were required.

In addition, the Congo Red test were carried out according to standard specification ISO R 182; this made it possible to determine, under standardized conditions, the time taken by a paper impregnated with Congo Red to change color by the action of the hydrochloric acid released on degradation of the sample at 180° C. A time of 81 minutes was found.

EXAMPLE 8

A composition which is intended for the production of shoes was prepared.

The procedure was as indicated in Example 1 with the following products:
3.9 kg of PVC powder having a viscosity index of 140;
1.95 kg of PVC powder having a viscosity index of 79;
0.078 kg of calcium stearate;
0.039 kg of zinc stearate;
0.039 kg of stearoylbenzoylmethane;
0.026 kg of sorbitol; and
2 kg of dioctyl phthalate.

The temperature in the high speed mixer was not allowed to exceed 105° C. and the temperature of the extruder was 125° C., 130° C., 135° C. and 140° C.

The Congo Red test provided a time of 157 minutes.

While the invention has now been described in terms of preferred embodiments, and exemplified and compared with conventional compositions, the skilled artisan will appreciate that various substitutions, omissions, modifications, and changes may be made without departing from the spirit thereof. Accordingly, it is intended that the scope of the invention be limited solely by the following claims.

What is claimed is:
1. A composition of matter comprising (1) a vinyl chloride polymer, (2) a plasticizer therefor, and (3) heat-stabilizing amounts of (i) a mixture of metal salts of aliphatic and aromatic organic acids, (ii) a polyol having at least four hydroxyl functions, at least one of which being a primary alcohol function, and (iii) a β-diketone having the structural formula:

$$R_1 - CO - CHR_2 - CO - R_3 \qquad (I)$$

wherein $R_1$ and $R_3$, which can be identical or different, represent:
- a linear or branched chain alkyl or alkenyl radical having at least one and up to 36 carbon atoms,
- an aralkyl radical having from 7 to 36 carbon atoms, and
- an aryl or cycloaliphatic radical having fewer than 14 carbon atoms, the cycloaliphatic radicals optionally comprising carbon-to-carbon unsaturation; with the proviso that the foregoing radicals $R_1$ and $R_3$ either may or may not be substituted, and, when substituted, each said substituent is selected from the group consisting of halogen, or, in the case of the aryl or cycloaliphatic radicals, methyl or ethyl radicals; said $R_1$ and $R_3$ optionally may also be modified by the presence of one or more of the linkages —O—,

or —CO—, in an aliphatic chain; and together $R_1$ and $R_3$ can also form a divalent alkylene radical of 2 to 5 carbon atoms, optionally containing a bridging oxygen or nitrogen atom;

$R_2$ represents:
- a hydrogen atom,
- an alkyl or alkenyl radical, having at least one and up to 36 carbon atoms, which can contain one or more of the linkages —O—,

or —Co—,
- a radical of the formula —CO—$R_4$, $R_4$ representing an alkyl radical having from 1 to 36 carbon atoms, or an aryl rdical having from 6 to 10 carbon atoms, or
- a radical of the formula

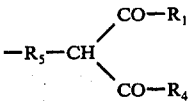

$R_5$ representing an alkyl radical having from 1 to 6 carbon atoms, and $R_1$ and $R_3$ being as above; with the further proviso that;

for $R_1$ and $R_3$, the carbon atom bonded to the respective carbonyl function of the compound (I) is free from ethylenic or carbonyl unsaturation;

for $R_1$ or $R_3$, the carbon atom bonded to the respective carbonyl function does not comprise a moiety which includes aromatic unsaturation;

one of the radicals $R_1$ or $R_3$ can represent a hydrogen atom;

$R_1$ and $R_2$ together can represent a divalent radical selected from among the following:
- a linear or branched alkylene or alkenylene radical, having up to 36 carbon atoms,
- an aralkylene radical having from 7 to 36 carbon atoms, and
- an arylene or cycloalkylene radical having fewer than 14 carbon atoms, the cycloaliphatic radicals optionally comprising carbon-to-carbon unsaturation;

and with the further proviso that such latter radicals too either may or may not be substituted, and, when substituted, each such substituent is selected from the group consisting of halogen, or, in the case of the aryl or cycloalphiatic radicals, methyl or ethyl radicals, and such latter radicals optionally being modified by the presence, in an aliphatic chain, of one or more of the linkages:

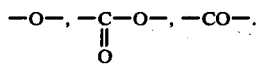

2. The composition of matter as defined by claim 1, wherein the mixture of metal salts of aliphatic and aromatic organic acids (3) (i) comprises the mixed salts of calcium, zinc, barium and cadmium.

3. The composition of matter as defined by claim 1, wherein the radicals $R_1$, $R_2$ and $R_3$ are unsubstituted.

4. The composition of matter as defined by claim 1, wherein the β-diketone (3) (iii) is selected from the group consisting of benzoylacetone, lauroylbenzoylmethane, myristoylbenzoylmethane, palmitoylbenzoylmethane, stearoylbenzoylmethane, behenoylbenzoylmethane, dilauroylmethane, dimyristoylmethane, dipalmitoylmethane, distearoylmethane, dibehenoylmethane, lauroylmyristoylmethane, lauroylpalmitoylmethane, lauroylstearoylmethane, lauroylbehenoylmethane, myristoylpalmitoylmethane, myristoylstearoylmethane, myristoylbehenoylmethane, palmistoylstearoylmethane, palmitoylbehenoylmethane, stearoylbehenoylmethane, 1-phenyltriacontane-1,3-dione, acetyltetralone, palmitoyltetralone, stearoyltetralone, palmitoylcyclohexanone, stearoylcyclohexanone and (paramethoxybenzoyl)-stearoylmethane.

5. The composition of matter as defined by Claim 4, wherein the polyol (3) (ii) is selected from the group consisting of D-xylitol, D-sorbitol and D-mannitol.

6. The composition of matter as defined by claim 2, wherein the mixture of metal salts of aliphatic and aromatic organic acids (3) (i) comprises the mixed salts of calcium and zinc.

7. The composition of matter as defined by claim 2, wherein the mixture of metal salts of aliphatic and aromatic organic acids (3) (i) comprises an anion selected from the group consisting of aliphatic and aromatic carboxylic acids, and fatty carboxylic acids.

8. The composition of matter as defined by claim 7, wherein the anion is selected from the group consisting of acetates, diacetates, stearates, oleates, laurates, palmitates, benzoates, hydroxystearates, and ethyl-2-hexanoates.

9. The composition of matter as defined by claim 1, wherein the vinyl chloride polymer (1) is a vinyl chloride homopolymer.

10. The composition of matter as defined by claim 1, wherein the vinyl chloride polymer (1) is a copolymer of vinyl chloride and up to about 20% by weight of an ethylenically unsaturated comonomer copolymerizable therewith.

11. The composition of matter as defined by claim 1, comprising, per 100 parts by weight of the vinyl chloride polymer (1), from about 5 to 120 parts by weight of the plasticizer (2), from about 0.1 to 5 parts by weight of the mixture of metal salts of aliphatic and aromatic organic acids (3) (i), from about 0.03 to 1 part by weight of the polyol (3) (ii), and from about 0.05 to 5 parts by weight of the β-diketone (3) (iii).

12. The composition of matter as defined by claim 11, comprising from about 0.1 to 0.25 parts by weight of the polyol (3) (ii) and from about 0.1 to 1 parts by weight of the β-diketone (3) (iii).

13. A shaped article comprising the composition of matter as defined by claim 1.

14. A shaped article comprising the composition of matter as defined by claim 11.

15. A shaped article comprising the composition of matter as defined by claim 6.

16. The composition of matter as defined by claim 1, further comprising at least one member selected from the group consisting of epoxidized soya-bean oil, an antioxidant, a UV light stabilizer, a lubricant, and admixtures thereof.

17. The composition of matter as defined by claim 1, wherein the β-diketone (3) (iii), $R_2$ is hydrogen.

18. The composition of matter as defined by claim 3, wherein the β-diketone (3) (iii), $R_2$ is hydrogen.

* * * * *